US008165934B2

(12) United States Patent
Manista et al.

(10) Patent No.: US 8,165,934 B2
(45) Date of Patent: Apr. 24, 2012

(54) AUTOMATED INVOICE PROCESSING SOFTWARE AND SERVICES

(75) Inventors: Richard S. Manista, West Milford, NJ (US); William J. McCormick, III, Warwick, NY (US); Eduardo Perez, Fair Lawn, NJ (US)

(73) Assignee: Micro Graphic Information Services Corp., Saddle Brook, NJ (US)

( * ) Notice: Subject to any disclaimer, the term of this patent is extended or adjusted under 35 U.S.C. 154(b) by 635 days.

(21) Appl. No.: 12/142,876

(22) Filed: Jun. 20, 2008

(65) Prior Publication Data

US 2009/0319402 A1 Dec. 24, 2009

(51) Int. Cl.
*G06Q 20/00* (2012.01)
*G06F 17/60* (2006.01)
(52) U.S. Cl. .................................................. 705/30
(58) Field of Classification Search ..................... 705/30
See application file for complete search history.

(56) References Cited

U.S. PATENT DOCUMENTS

| | | | |
|---|---|---|---|
| 6,032,132 A * | 2/2000 | Nelson | 705/34 |
| 6,058,380 A | 5/2000 | Anderson et al. | |
| 6,507,826 B1 | 1/2003 | Maners | |
| 6,826,542 B1 | 11/2004 | Virgin et al. | |
| 6,993,507 B2 | 1/2006 | Meyer et al. | |
| 7,283,976 B2 | 10/2007 | Aber et al. | |
| 7,321,864 B1 | 1/2008 | Gendler | |
| 2002/0082990 A1 | 6/2002 | Jones | |
| 2002/0116334 A1 | 8/2002 | Bennett et al. | |
| 2002/0194126 A1 | 12/2002 | Randell et al. | |
| 2003/0130942 A1 | 7/2003 | Campbell et al. | |
| 2003/0212617 A1 | 11/2003 | Stone et al. | |
| 2003/0220875 A1 | 11/2003 | Lam et al. | |
| 2004/0181482 A1 | 9/2004 | Yap | |
| 2004/0210526 A1 | 10/2004 | Brown | |
| 2005/0131780 A1 | 6/2005 | Princen | |
| 2005/0177476 A1 | 8/2005 | McCandless et al. | |
| 2005/0177507 A1 * | 8/2005 | Bandych et al. | 705/40 |
| 2006/0089907 A1 | 4/2006 | Kohlmaier et al. | |
| 2006/0095373 A1 | 5/2006 | Venkatasubramanian et al. | |
| 2006/0259427 A1 | 11/2006 | Randell et al. | |
| 2007/0192218 A1 | 8/2007 | Licardi et al. | |
| 2007/0219880 A1 | 9/2007 | Stone et al. | |
| 2007/0271160 A1 * | 11/2007 | Stone et al. | 705/30 |
| 2007/0288364 A1 | 12/2007 | Gendler | |
| 2008/0091577 A1 * | 4/2008 | Holmes et al. | 705/30 |

* cited by examiner

*Primary Examiner* — Garcia Ade
(74) *Attorney, Agent, or Firm* — Rothwell, Figg, Ernst & Manbeck, P.C.

(57) ABSTRACT

A method and system for automated invoice processing. An improved method for invoice processing based on an application service provider model in which invoices can be accessed and approved via the Internet from anywhere in the world. This method and system allows a company to manage the process of storing, reviewing, approving, and paying invoices from a single, centralized application. The invoice processing application is integrated with an accounting or ERP system such that payment can be made automatically and redundant data entry eliminated. The approval hierarchy used by the invoice processing application can be obtained from the human resources system of the client organization.

19 Claims, 14 Drawing Sheets

| Find Requestor | | | | | |
|---|---|---|---|---|---|
| Last Name | | First Name | | | Find |
| Region | SBO01 | Dept # | | Dept Name | Exit |
| Last Name | First Name | e-mail | Dept No | Department | Region |
| Giacone | Frank | frankg@mgcimaging.com | 6001010 | Operations | SBO01 |
| Wallace | Ryan | rwallace@rfem.com | 6001010 | Operations | SBO01 |
| Higgins | Jerry | jerryh@mgcimaging.com | 6001010 | Operations | SBO01 |
| Chai | Tom | thomas@mgcimaging.com | 8191010 | Accounting | SBO01 |
| Manista | Rick | rickm@mgcimaging.com | 8191010 | Accounting | SBO01 |
| McCormick | Bill | billm@mgcimaging.com | 8191010 | Accounting | SBO01 |
| M | Alexander | alexm@mgcimaging.com | 8191010 | Accounting | SBO01 |

Enter Part of Name then click Search - Double click item from list

1100

Add Line Item Detail No 1

Charge

GL Account

Dept #

Description

GL line amount

Add Line Charge

AUTOMATED INVOICE PROCESSING SOFTWARE AND SERVICES

TECHNICAL FIELD

The present invention relates generally to the field of automated invoice processing.

BACKGROUND

Many organizations, both large and small, face challenges related to tracking and paying a large number of invoices that are received on an ongoing basis. Upon receipt of invoices for various goods and services, an accounts payable or other department has to make determinations such as whether the expenditure was authorized, whether there is an associated purchase order, or whether the invoice needs to be forwarded to an appropriate manager for approval. Additionally, many organizations receive invoices at many different locations further complicating the process of managing invoices.

Typically, invoice management is accomplished via manual or partially automated processes. These processes frequently rely on accounts payable personnel to make decisions such as which personnel should approve a particular invoice or which general ledger ("GL") code should be associated with that invoice.

There are many disadvantages to current methods of tracking and managing received invoices. First, many of these manual or semi-manual processes rely on the knowledge of persons within the organization to determine if the correct person with the allowed dollar authorization has approved the invoice.

A second problem is that the data from invoices usually needs to be inputted into the organization's accounting or enterprise resource planning ("ERP") system. If the invoices are managed manually or with a separate system, the data must be manually keyed into the accounting or ERP systems, or even worse, re-keyed after having been entered into a separate system for managing invoices.

A third problem is that there is often little or no record of who is presently reviewing a particular invoice and what steps the invoice is processed through from the time it was received until the time it was paid. This type of audit trail is important for responding to inquiries as to a particular invoice's status as well as for providing a historical record of which personnel approved and paid an invoice.

A fourth problem is that invoices of different formats can be difficult to manage. As more business processes become automated, the number of vendors offering electronic invoices is increasing. The format of these invoices will vary depending on the systems used to create them. Further complicating issues, many vendors will continue to provide traditional printed invoices for the foreseeable future. These varying formats can be difficult to manage or aggregate and frequently require the information to be manually entered into an accounting or ERP system after an invoice has been approved for payment.

A fifth problem is that the personnel required to approve invoices are not found in the same facilities. As organizations become more decentralized, it is common for personnel needed to approve invoices to not be in the same location as where the invoices are received and/or processed. Routing invoices to remote locations for approval can be difficult to manage. Frequently, the invoices are routed to remote personnel for approval via email or fax. The problem with these methods is that there is no means of tracking whether the recipient has viewed or acted upon the invoice, making determining the status of a particular invoice difficult, if not impossible.

A sixth problem is that organizations who elect to scan their invoices have limited means of supplying the scanned image files to the servicing organization. Common methods for transferring large number of large image files, such as email or FTP, are typically cumbersome and error prone.

What is desired is an automated invoice processing system that addresses at least some of the above problems.

SUMMARY

The present invention provides systems and method for overcoming at least one or more of the above problems.

More particularly, in one aspect, the invention provides a computer implemented method for invoice processing. In one embodiment, the method includes: receiving an electronic image of an invoice; assigning an invoice identifier (ID) to the invoice; storing the electronic image of the invoice such that the electronic image of the invoice is linked with the invoice ID so that the invoice ID can be used to retrieve the electronic image; storing information pertaining to the invoice such that the information is linked with the invoice ID; in response to a request transmitted from a user's computer, transmitting the electronic image to the user's computer, which is configured to display the electronic image; after transmitting the electronic image to the user's computer, receiving from the user's computer a message indicating whether or not the invoice requires approval; if the invoice does not require approval (e.g., the invoice is pre-approved), placing the invoice in a first queue (a.k.a., the "Shared Service" queue); and if the invoice requires approval, placing the invoice in a second queue (a.k.a., the "Workflow" queue) that is different than the first queue.

In some embodiments, the method also includes receiving, from a user's computer, a request to process the invoices from the Workflow queue of invoices; and in response to the request to process the invoices from the Workflow queue of invoices, transmitting to the user's computer a first user interface screen that includes an electronic image of an invoice from the Workflow queue, information pertaining to the invoice, and control elements for enabling the user to select an e-mail address of an approver and cause an e-mail to be sent to the approver's e-mail address, wherein the e-mail includes a link that when activated causes to be transmitted to the approver's computer a second user interface screen that includes the electronic image of the invoice and control elements to allow the approver to indicate his approval of the invoice.

In another aspect, the invention provides an invoice processing system. The system, according to some embodiments, includes: an application server configured to execute an invoice processing application and connected to the internet via a communications network; a database configured to store information relating to an invoice being processed by said invoice processing application and configuration information relating to said invoice processing application; a first one or more client computer workstations connected to the internet via a communications network, configured to receive an electronic image of said invoice and to allow a user to input additional index data relating to said invoice and submit said electronic image and said index data to said invoice processing application; and a second one or more client computer workstations connected to the internet via a communications network and configured to enable an approver to receive and view said electronic image and said additional index data from said invoice processing application and indicate their approval or rejection of said invoice.

Further aspects and embodiments of the present invention are described below.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

FIG. 3 is an exemplary screenshot of an invoice data screen according to embodiments of the present invention.

FIG. 4 is an exemplary screenshot of a dashboard screen according to embodiments of the present invention.

FIG. 5 is an exemplary screenshot of a approval screen according to embodiments of the present invention.

FIGS. 8-10 are exemplary user interface screen of the system administration module according to embodiments of the invention.

FIGS. 11-14 are exemplary user interface screens.

DETAILED DESCRIPTION

An embodiment of the present invention will be described in terms of a "servicing organization" which provides a computer implemented centralized invoice processing system, known as the Document Tracking System ("DTS"), and a "client organization" which utilizes the DTS to manage their invoice processing. The term "users" refers to personnel at the client organization who interact with the system via their Internet connected workstations.

In one aspect, an embodiment of the present invention provides systems and methods for automated invoice processing.

In one aspect, an embodiment of the present invention allows companies to utilize the DTS without manually installing any hardware or software. The DTS is implemented utilizing an application service provider ("ASP") model. The only requirements for using the system are internet access and an appropriate browser.

Figure 1:
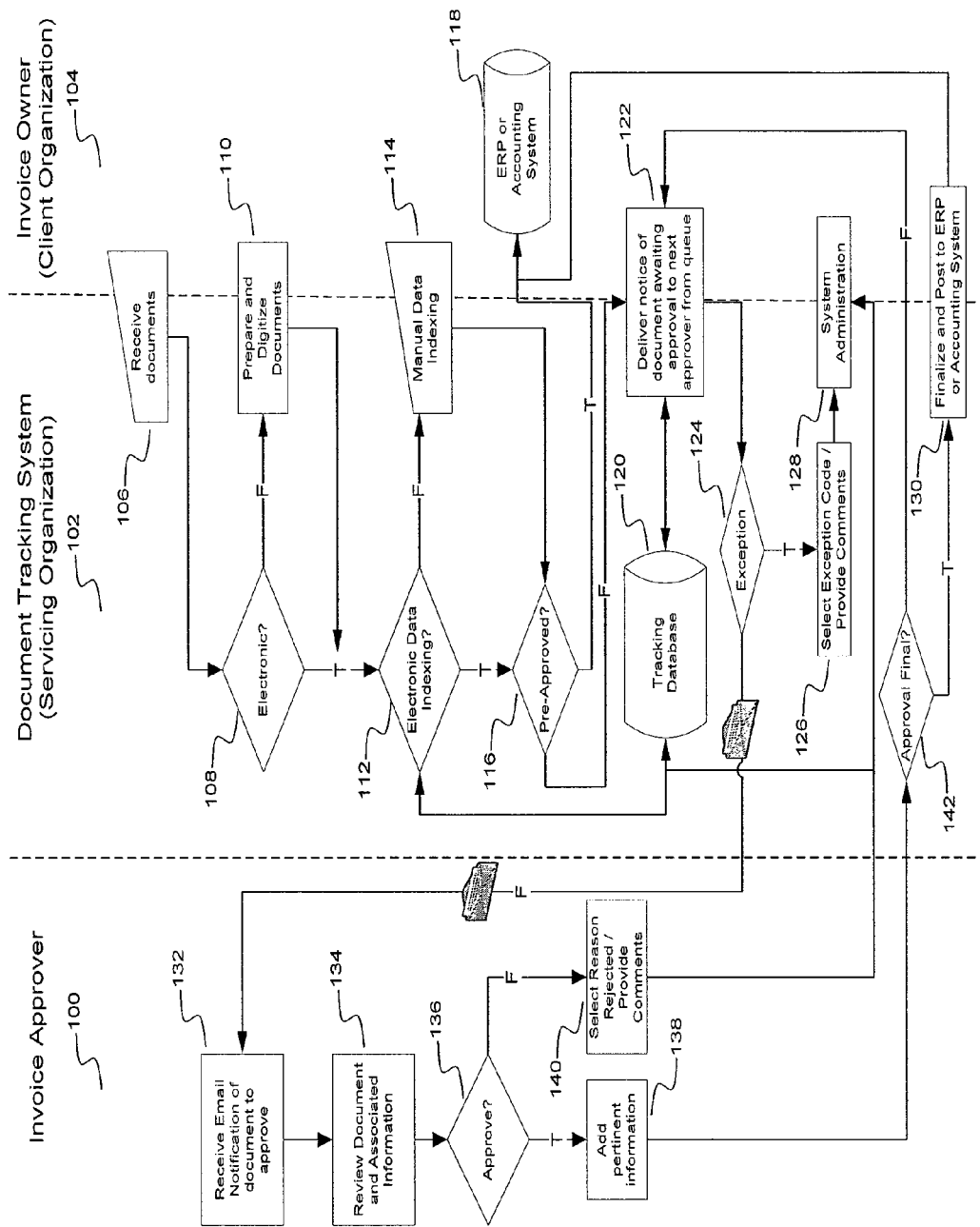
FIG. 1. is a flow chart illustrating the flow of documents through an embodiment of the invention.

Referring now to FIG. 1, FIG. 1 illustrates a representative process flow of an invoice through a DTS according to an embodiment of the present invention. FIG. 1 is divided into 3 regions representing where the various process steps within that region would be accomplished. The leftmost region illustrates the steps performed by an invoice approver 100. The processing of the invoice approver 100 workflow occurs primarily on the individual workstations of the approvers. The center region illustrates steps performed by the DTS 102. The rightmost region illustrates the steps performed by the client organization 104. Several process steps are shown on the border between the DTS and the client organization. These steps can be configured to be performed either by the servicing organization, the client organization, or outsourced to a third party depending based on the preferences of the client organization.

Step 106, in which documents (e.g., invoices) are received from a client organization, is the starting point for the processing. The client organization can choose how to input the initial invoice into the system. The invoice can be mailed or faxed to the servicing organization who will manually scan the paper invoice into the system, the organization can use scanning software ("ScanSend") and scan invoices at their location directly into the servicing organization server via the Internet, or they can have a third party vendor scan their paper and FTP the images to the servicing organization. Also, the invoice can be faxed and then electronically captured. Other options also exist (e.g., email).

Step 108 determines whether the incoming invoice was received in a paper or electronic format. If an invoice is received in a paper format, then it is prepared and digitized in step 110. Step 110 can be performed by either the servicing organization or the client organization depending on how the system is configured.

If it is determined in step 108 that an invoice is already in an appropriate electronic format, the invoice then moves to step 112 where electronic data indexing is performed. This electronic data indexing step 112 may include attaching a unique barcode to the first page of the document, which barcode correlates to a document ID, the primary identifier of the document within the DTS and a tracking database 120. Depending on the format of the invoice, additional data about the invoice may be automatically, electronically recognized and entered into the tracking database 120 using, for example, optical character recognition ("OCR") capabilities.

By electronically storing and indexing the invoices, client organizations can perform these steps anywhere in the world without shipping the paper invoices to one central site. The bar codes may be generated by a centralized computer so that they are guaranteed to be unique. Each barcode can also have a predetermined prefix for invoice designation into the application. For instance, a barcode prefix can be EU for Europe, AS for Asia, LG for Legal, etc.

Once the invoice, which is now an image, resides on the servicing organization's server, the barcode is automatically read by the DTS. The document ID is then added to the tracking database 120, which stores information regarding the individual invoices. The tracking database will allow the client organization to track the status of their invoice as well as create and capture the historical audit trail from entry to completion.

An application (e.g., a web-based application) provides the capability for either the servicing organization's staff or the client organization's staff to enter more information about the invoice into the tracking database 120 before the first step of the approval routing begins. For example, if the invoice is going to be inserted into an Accounts Payable Application, besides the unique document ID, the invoice number, invoice date, dollar amount and Purchase Order number can be entered into the tracking database 120 and associated with the document ID of the invoice.

If the client organization requires that additional data be entered for the document that cannot be acquired electronically this is accomplished through manual data indexing in step 114. The fields entered through manual data indexing are typed into a form and stored in the tracking database 120 and associated with a document ID. The client organization can specify the data fields that are available for entering data and can make particular fields required. Step 114 can be performed by users at the client organization or by the servicing organization.

Once the data capture and indexing step for an invoice is complete, an operator may use the DTS to view the invoice (e.g., using their web browser) and evaluate whether the invoice should be placed in a Shared Service queue or a Workflow queue (step 116). Invoices that do not require approval or have been pre-approved should be placed in the Shared Services queue. Whereas invoices that require approval or requires further approval should be placed in the Workflow queue.

Many client organizations have invoices that have already been approved or have purchase order number and do not require approval. These invoices are usually entered into the client's accounts payable ("AP") software. If the invoice does not need approval, then the process my flow to step 118, otherwise it may flow to step 122.

In step 118, the operator viewing the invoice can simply click on a "Send to shared services" button that is displayed to the operator along with the image of the invoice. In response to the operator selecting the "send to shared services" button, the invoice is placed in one or one or more Shared Services "buckets" or queues. The Shared Services queues are set-up before hand by the client. That is, each client has the ability to decide how to place the invoices in the shared services queues. Many clients will create a shared services queue for each of group of geographic regions (e.g., America, Europe, Asia, etc.) or for each of a group of type (e.g., legal, technology, real estate, etc.). The routing of an invoice to a Shared Services queue may depend on information contained in the barcode added to the invoice or the routing may be done manually by the user. For example, if an invoice has a barcode that includes the code "EU," then when a user selects to move this invoice to a Shared Services queue by activating the send to shared services button, the system will read the barcode and automatically place the invoice in the Europe queue.

Figure 14:
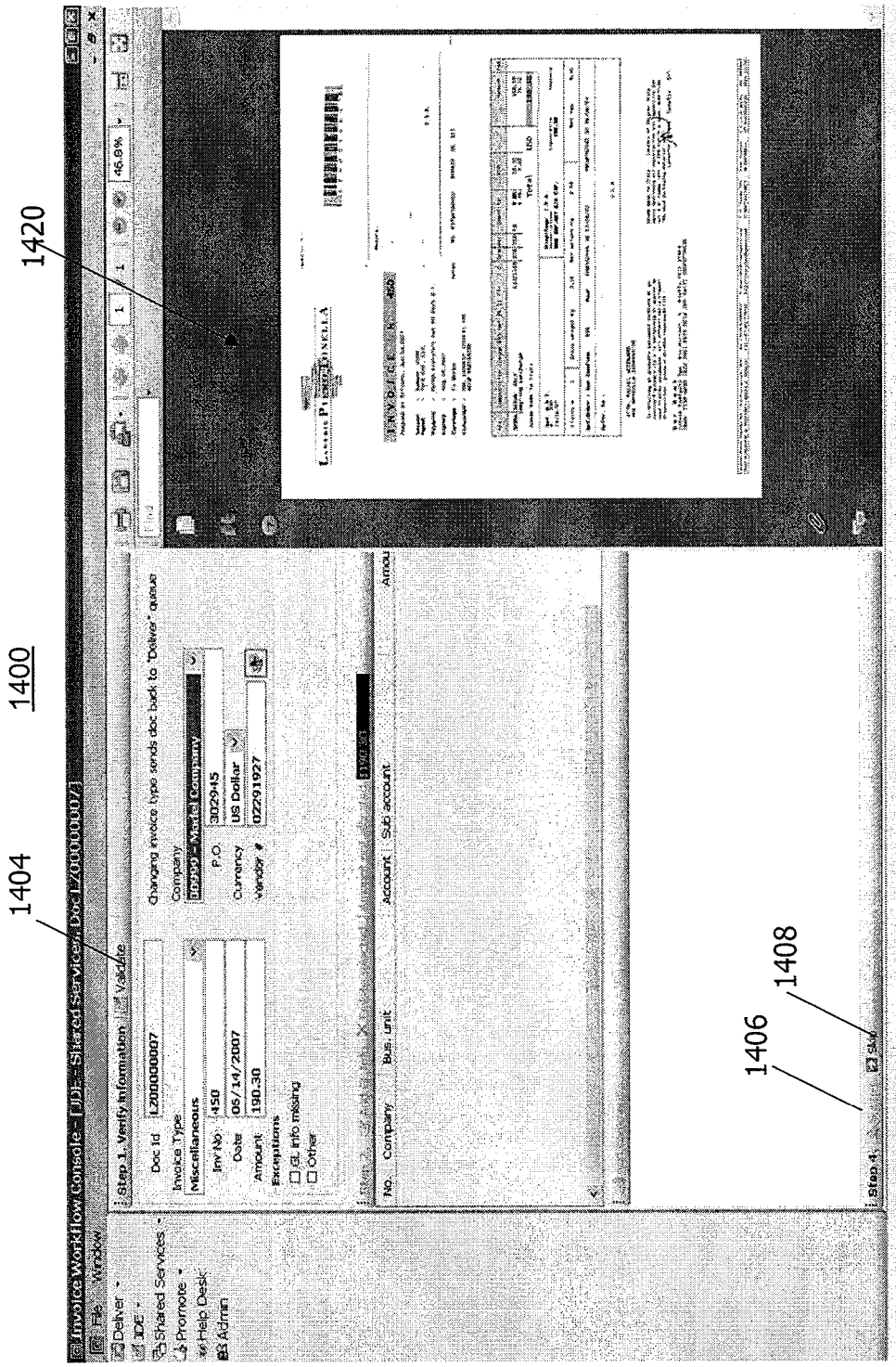

The operator or another user can access these Shared Services invoice queues and process the invoices in the queues at any time from any Internet connected computer having an appropriate browser. For example, a user can use his/her browser to access a shared services screen 1400 (see FIG. 14). As illustrated in FIG. 14, screen 1400 displays to the user an invoice from a user selected Shared Services queue as well as information stored in the tracking database that is associated with the displayed invoice (e.g., document ID, invoice number, invoice date, etc.). The shared services screen 1400 also displays controls (e.g., buttons, links, etc.) that enable the user to input additional information regarding the invoice, such as, for example, the vendor name and/or number of the vendor who generated the invoice and the GL account number or numbers identifying the accounts from which the invoice should be paid. In some embodiments, to enable a client organization to process invoices completely without having to access their own AP software, the DTS stores the client organization's vendor list, which maps vendor names to vendor numbers. Thus, in some embodiments, the shared services screen 1400 enables the user to input a vendor name and query the vendor list for the corresponding vendor number.

Typically, a user will check that the displayed information regarding the invoice that is displayed is correct. If the user is satisfied that it is correct, the user would select the "validate" button 1404. Next, the user enters GL information into the screen and comments, if any. Next, the user activate the submit button 1406 to complete the processing of the invoice. Otherwise, the user can activate the skip button 1408 to process the next invoice in the selected queue. Activating skip button or submit button causes the next invoice in the selected shared services queue to be displayed automatically in the invoice image window 1420 as well as the information concerning the invoice (e.g., invoice number, invoice date, amount, etc.). For each invoice for which the user has activated the submit button 1406, the system will send automatically to a specified AP system a message comprising information stored with the invoice (e.g., the GL information input by the user, the invoice amount, the vendor name/code input by the user, etc.), which information should be sufficient for AP system to pay the invoice.

Referring back to FIG. 1, if an invoice requires approval as determined in step 116, the invoice enters the Workflow queue and the process may proceed to step 122. A user accesses an invoice dashboard screen (see FIG. 3) which allows them to view images and details of each invoice in the Workflow queue. From this dashboard screen, a user may enter additional information about the invoice and/or validate the information entered previously.

Figure 3:
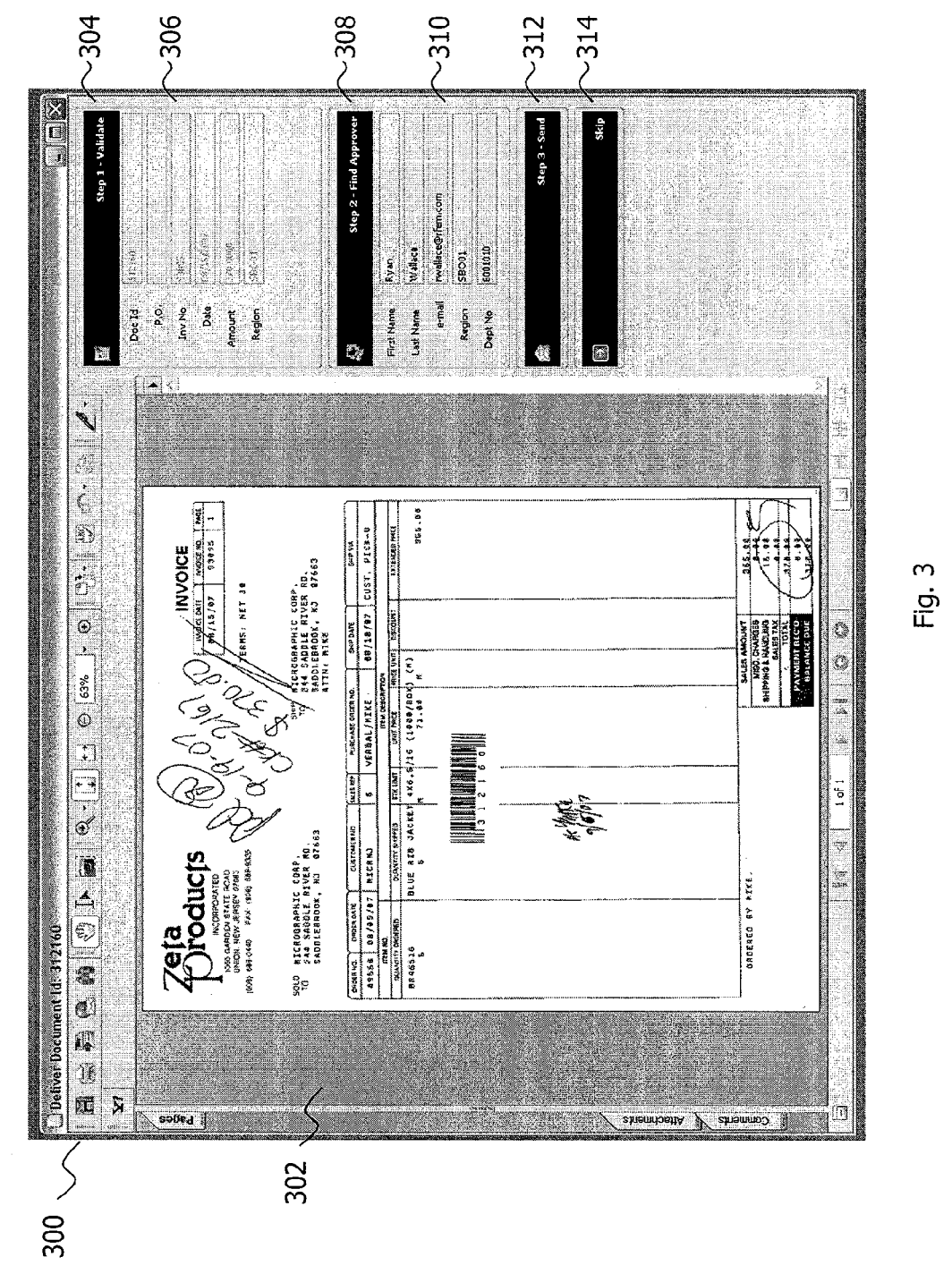

FIG. 3 is an exemplary screenshot of an invoice dashboard screen according to embodiments of the present invention. The invoice screen 300 is used by users at the client organization to manage invoices that are ready to be submitted to the approval workflow. An invoice display window 302 displays an invoice from the queue to the user. A data entry panel 306 displays information from the invoice that has been captured and stored in the database 120 and contains various controls allowing a user to enter (or modify) information about the invoice. Once the user is satisfied with the contents of the data displayed in panel 306, the user can click on a validate button 304. Upon clicking the validate button 302, the controls in data entry panel 306 are rendered as read-only and a find approver button 308 is made active.

Clicking the find approver button 308 causes a "choose approver" screen 1100 to be displayed (see FIG. 11). This screen enables the user to select a person to approve the invoice. As illustrated in FIG. 11, screen 1100 may include a list of names and associated e-mail addresses. The DTS may have access to the client's entire email directory. Thus, the DTS may automatically populate screen 1100 using information from a pre-existing e-mail directory.

Once an approver is selected (by, for example, double clicking on a name displayed in the choose approver screen), the approver's information (e.g., name, email, dep. No., region) is shown in an approver data panel 310. At this point, the user can click a send button 312 which will cause the DTS to send an email to the selected approver notifying them that an invoice is ready for their approval. Alternatively, the user could click a skip button 314 which causes the invoice data screen 300 to display the next invoice from the queue requiring processing.

Figure 12:
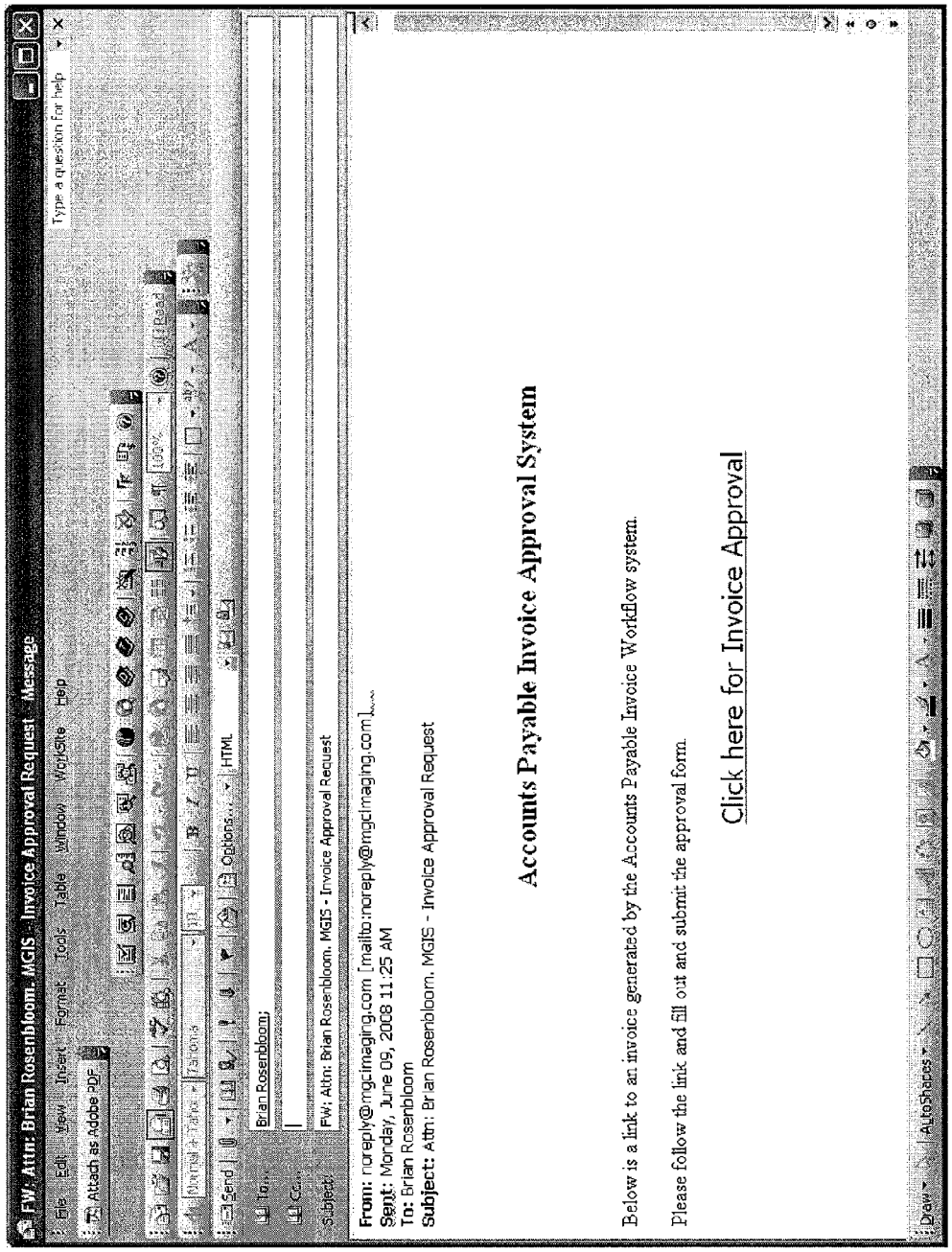

If no exceptions are found or noted in step 124, an email notice indicating a document is awaiting approval is sent via email to the selected approver. The email sent to this person includes a hyperlink to a webpage displaying the invoice. An example email is illustrated in FIG. 12.

If an exception is found in step 124, the user is prompted to select an exception code and provide comments in 126. This information is then reported to a system administrator, either at the client organization or the servicing organization, at step 128. The system administrator can then either correct the issue causing the exception or report the exception to the appropriate personnel.

In the case with no exceptions, the approver receives the email notification for the invoice to approve in step 132. In step 134, the approver clicks the hyperlink which takes them to the web page displaying the document to be approved and related data that has been entered into the tracking database.

Figure 5:
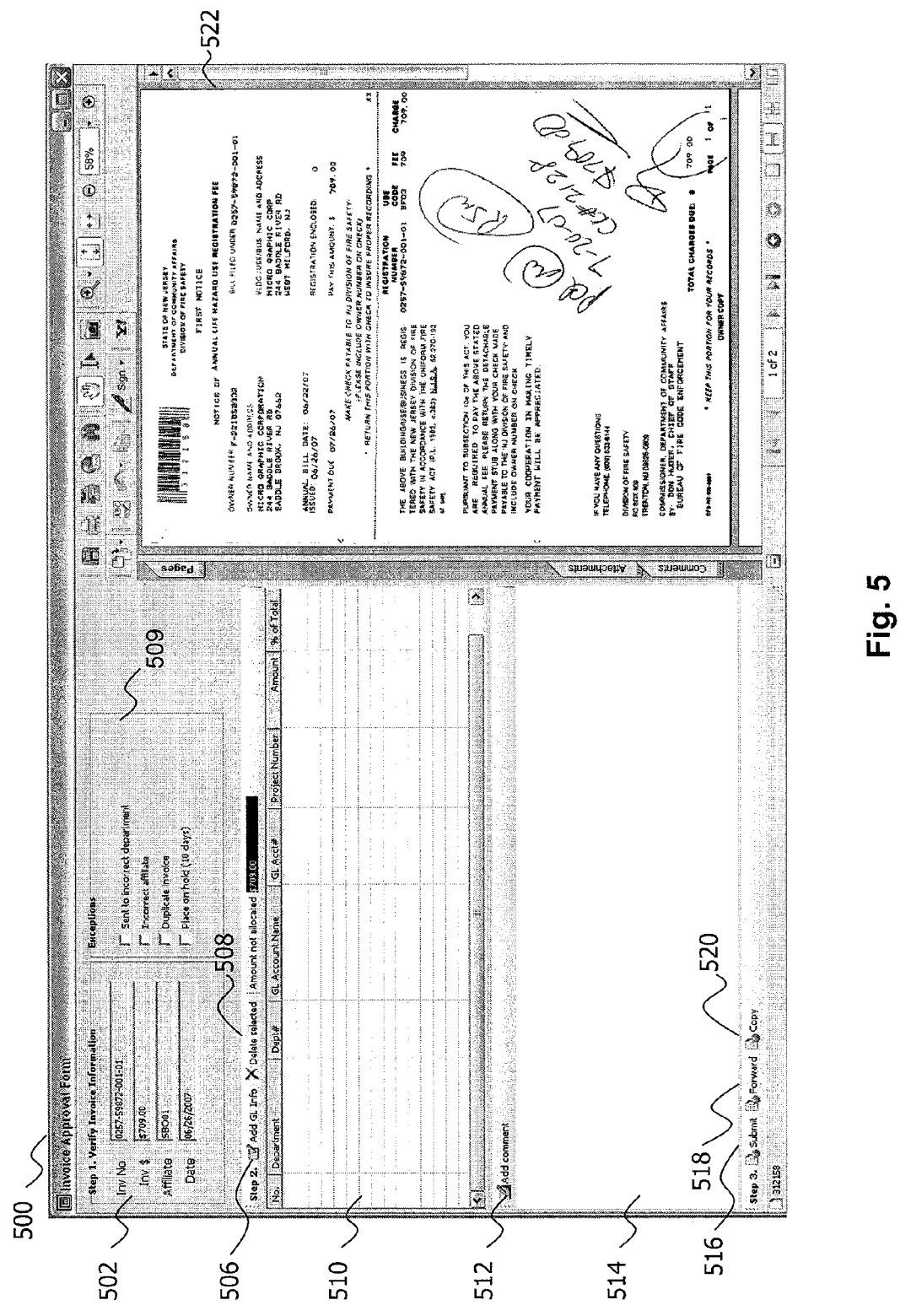

FIG. 5 is an exemplary screenshot of an approval screen according to embodiments of the present invention. The approval screen 500 is the screen that is displayed to an approver when the user clicks on the hyperlink included in the notification email.

A verify invoice information panel 502 displays information regarding the invoice. An exceptions selection panel 504 provides the approver with checkboxes which they may use to select exceptions related to the invoice. When an approver clicks an "Add GL Info" button 506, a dialog box 1300 (see FIG. 13) is presented to the approver allowing them to either select or enter a GL Account, Department Number, Description and GL Line Amount.

The DTS has access to the client organization's GL system and has the ability to display the GL account numbers that an individual approver has rights to. The approver can select the accounts or GL code to which they want to charge invoice line items. The application can track the total amount of dollars the approver charges to each account and can add the costs for each line item to insure that the sum is equal to the gross dollar amount of the invoice in the Tracker.

Referring back to FIG. 5, a GL Information grid control 510 displays the GL information that has been entered for this invoice. A "Delete selected" button 508 will the delete the GL information for the selected line from the GL Information grid control 510.

An "Add comment" button 512 displays a dialog in which the approver may enter a free text comment. The comment display panel 514 displays a read-only listing of all comment entered for the invoice being approved. A "Submit" button 516 is clicked by the approver to indicate they have finished their review of the invoice and that the processing should proceed to the next step of the workflow. A "Forward" button 518 is clicked by the approver to select a user to receive the invoice next. This is a means to allow the approver to deviate from a configured workflow hierarchy when necessary. A "Copy" button 520 is clicked by the approver to select a user to whom a copy of the invoice should be sent. The approval screen 500 displays each invoice in a invoice approval screen display window 522.

During the approval step, the approver also has several exception reporting options. Exception options, such as: duplicate invoice, wrong approver, do not pay, new vendor, or any custom exceptions configured by the client organization, are available for an approver to select (see window 509). The marking of an exception (as well as comments entered by the approver) will stay with the document history in the tracking database for the entire retention period of the document.

When an approver has completed verifying and assigning the account codes, they simple click on a "Submit" button.

If the approver chooses to reject the document in step 136, they are prompted to select a reason for the rejection and provide comments in step 140. Once any additional information has been added to the document record, the document will be available in the system administration 128 module.

If the approver chooses to approve the document in step 136, they next add any pertinent information regarding the approval in step 138.

After the approver approves the invoice, DTS automatically determines whether any other approvers need to approve the invoice. For example, DTS allows a client organization to store its corporate approval routing hierarchy. The hierarchy is normally based on the highest dollar amount an individual has the rights to approve. After an invoice is approved by an individual, DTS will check the routing hierarchy information to determine whether another email is to be automatically sent to a different individual for further invoice approval.

For example, if an invoice is for $50,000.00, the person's name on the invoice itself may only have approval rights for $10,000.00. The application will allow the first person to approve the invoice and will then automatically route the invoice through the hierarchy chain until it reaches a person in the specified chain of command, with approval rights equal to or greater than the invoice amount of $50,000.00. As each approver is emailed and linked to the invoice, the DTS will track transaction history. The tracking database 120 will store each person who received the email, the exact date and time it was sent as well as the status. The status can show whether the approver has opened the document, approved it or if it is pending. This information will become part of the document/image history for audit and compliance purposes.

During the approval stage, as discussed above in connection with FIG. 5, the application allows the approver to send the document manually to another person in the email list outside of their hierarchy by clicking the "forward" button 518. This is beneficial to individuals who are sharing the cost of an invoice with other departments. The DTS will track this transaction as well as continue to notify the appropriate users within the hierarchy until all of the correct individuals have acted on the transaction.

In step 142, the DTS checks to see whether the invoice has been approved by each of the approvers in the necessary hierarchy (i.e., the invoice approval is final). If the invoice approval is final, then the invoice moves to the approved invoice queue (step 130), otherwise control is again passed to step 122 where an e-mail is sent to the next required approver.

Figure 4:
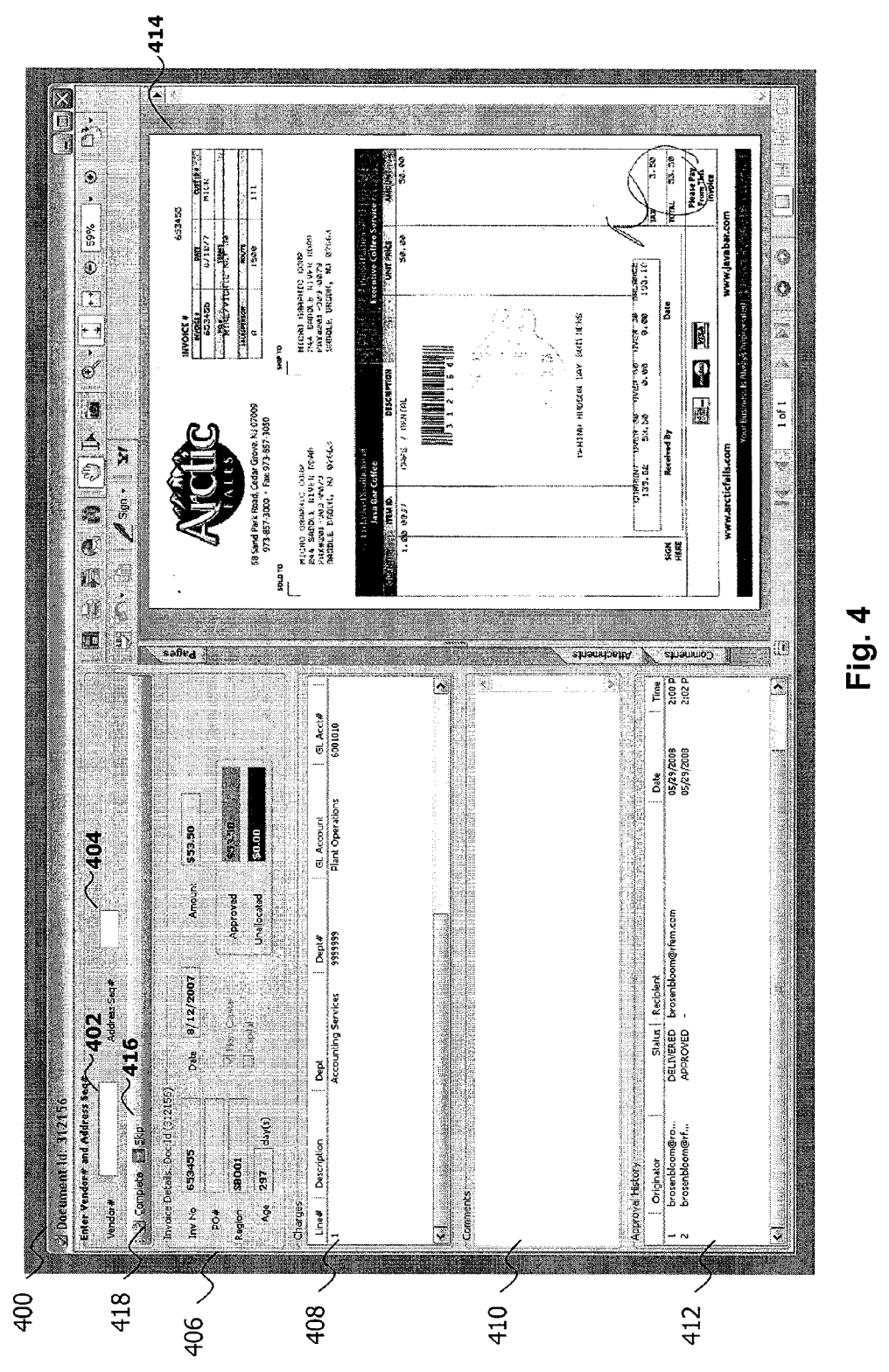

A user may use a web browser to process the invoices that have made it to the "approved queue." For example, the user may activate an "approved" button (not shown) on a dashboard and then receive, in response, a user interface screen as shown in FIG. 4.

FIG. 4 is an exemplary screenshot of a dashboard screen according to embodiments of the present invention. The dashboard screen 400 is used by users at the client organization to navigate and view invoices that have been approved and are now ready to be designated as complete so that they can be posted to the client organization's accounting or ERP system.

The dashboard screen 400 displays an invoice in a dashboard invoice display window 414. Information that has been entered about the invoice being displayed is shown in an invoice details panel 406. A listing of any Department/GL Account Information assigned to each invoice line item is displayed in the charges grid control 408. A listing of any comments made during the approval workflow is displayed in the comments grid control 410. A listing showing the results of each approval are shown in an Approval History grid control 412. The user may enter a vendor number in the vendor number text box 418 and an address sequence number in the address sequence number text box 414. The user viewing the dashboard screen may complete the approval process for an invoice by clicking the "Complete" button 418. If the user wants to move to the next invoice without posting the invoice, they can move to the next invoice by clicking "Skip" button 416.

All invoices designated as complete, are then marked as "approved" in the tracking database 120. Depending on a client organization's desired frequency, DTS will collect all of the "approved" invoices and all of the captured data (Invoice number, Date, Dollar Amount, GL account numbers, Vendor Number, etc.) and send a file to a specified user at the client organization at predetermined intervals. The client organization then automatically loads this file into their AP software (e.g., Peoplesoft, Oracle, SAP) and completes the payment process.

After the approved invoice data has been provided to the client organization, it is then paid by the client organization's ERP system or AP software. The client will then send to the servicing organization a file containing all of the paid info (invoice number, date, dollar amount, GL account numbers, vendor number, etc.). DTS has a historical retrieval system which allows the client organization to retrieve completed/paid invoices by any combination of fields for a period of many years. The tracking database 120 allows a client organization's AP staff to trace the status of an invoice at any point in time. It serves as a client organization's Help Desk.

The tracking database 120 allows the application to show where in the approval process an invoice is, shows the hierarchy routing, lists all exceptions and allows the client organization's AP staff to act on an exception, as well as trace invoices to handle vendor inquires about payment. All invoices in the tracking database can be itemized through reports or searches. The client organization has the ability to itemize all invoices which have not been approved by any date range or age. They can report by approver history or department history of approvals/timing.

Figure 2:
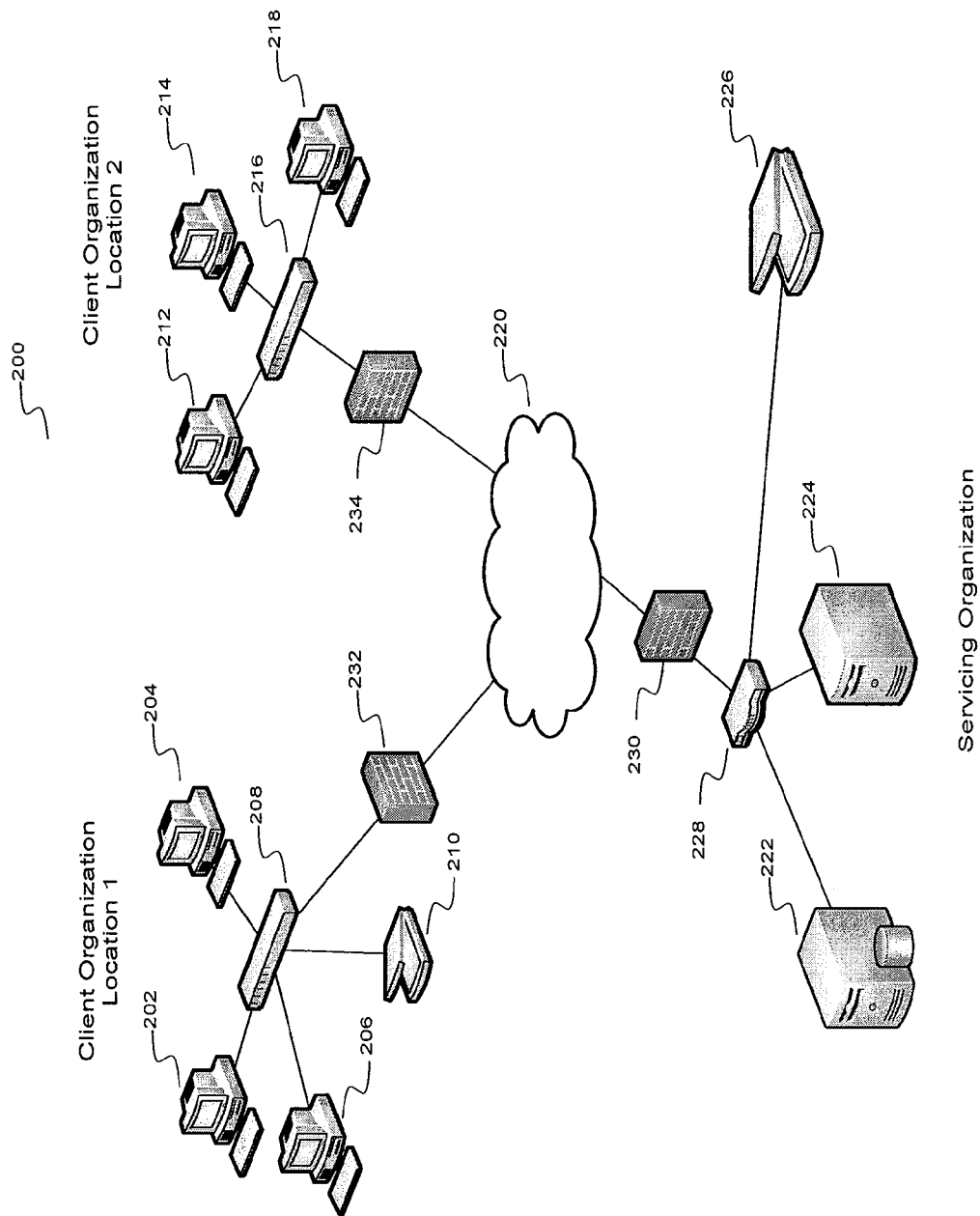
FIG. 2 is a diagram of a representative architecture of an invoice processing system according to An embodiment of the present invention.

Referring now to FIG. 2, FIG. 2 illustrates an example representative architecture of an invoice processing system according to an embodiment of the present invention. The system shown in FIG. 2 is provided soley for the sake of illustration and is not intended to limit the scope of the invention. Other architectures than the one shown are contemplated.

FIG. 2 shows invoice processing system 200 which is implemented according to an Application Service Provider ("ASP") model. Client computer workstations 202, 204, 206 may be connected to a local area network (e.g., via a switch/hub 208) that is connected to the Internet 220. Network traffic between the local area network and the Internet 220 may be monitored by a firewall 232 to protect the systems and data from unauthorized access. Scanner 210 may be a networked scanner or copy machine. Similarly, client computer workstations 212, 214, and 218 may be connected to a local area network (e.g., via a switch/hub 216) that is connected to Internet 220. Network traffic between the local area network and the Internet 220 may be monitored by a firewall 234 to protect the systems and data from unauthorized access. In some embodiments, client computer workstations 212, 214, and 216 are located at a separate location than computer workstations 202, 204, and 206.

An application implemented using an ASP model is typically structured with a centralized server or data center which hosts the application for a number of different client organizations. Frequently, a client organization will access the application over the Internet via a web browser.

Application server 224 is a server computer which hosts the centralized portion of the invoice processing application. In a some embodiments, application server 224 executes web server software (e.g., Microsoft Internet Information Services) which allows complex, data-driven web applications to be executed. Application server 224 may be connected to database server 222 directly or through router 228.

In some embodiments, database server 222 runs enterprise class relational database software (e.g., Microsoft SQL Server or Oracle or other software). One or more databases are hosted on database server 222, such as the tracking database 120. As described above, tracking database 120 may contain the data necessary to track invoices, maintain invoice statuses, and keep an audit history of everything that happens to any given invoice. Other databases that might be hosted on database server 222 include an administrative database which would maintain user access rights, approval hierarchies, exception codes, and other configuration data not specifically related to a particular invoice. These databases can store the data for multiple client organizations or each client organization can be maintained in a separate database instance.

In a some embodiment, client computer workstations 202, 204, 206, 212, 214, and 218 are personal computers running Microsoft Windows or Mac OS which can access the Internet via a web browser such as Microsoft Internet Explorer or appropriate browser. In this particular example, client computer workstations 202, 204, and 206 are utilized by users in the client organization's accounts payable department. These users receive invoices in electronic or paper form. Paper invoices are scanned using scanner 210 and the scanned version is sent to server 224 so that they may tracked by the application. These users access the invoice processing system via a web browser to manage the invoice approval process.

Client computer workstations 212, 214, and 218 may be utilized by invoice approvers. As described herein, the approvers receive emails containing hyperlinks to pages displaying invoices awaiting their approval. When the approver clicks on a hyperlink in an email indicating they have an invoice to approve, their web browser is directed to the appropriate web page. This web page allows the approver to approve or reject the invoice and enter comments and other data regarding the invoice.

As mentioned above, scanner 210 can be used by personnel of the client organization to scan invoices that are received in paper form so that they may be processed by the invoice processing system 200. In some embodiments, specialized software, called ScanSend, is installed on scanner 210, which allows for scanned documents to be sent to application server 224 from the scanner with little user intervention.

Client organizations have the option to allow the servicing organization to handle the scanning of paper invoices into the invoice processing system. Networked scanner 226 is used by the servicing information to digitize invoices for input into the system.

Figure 6:
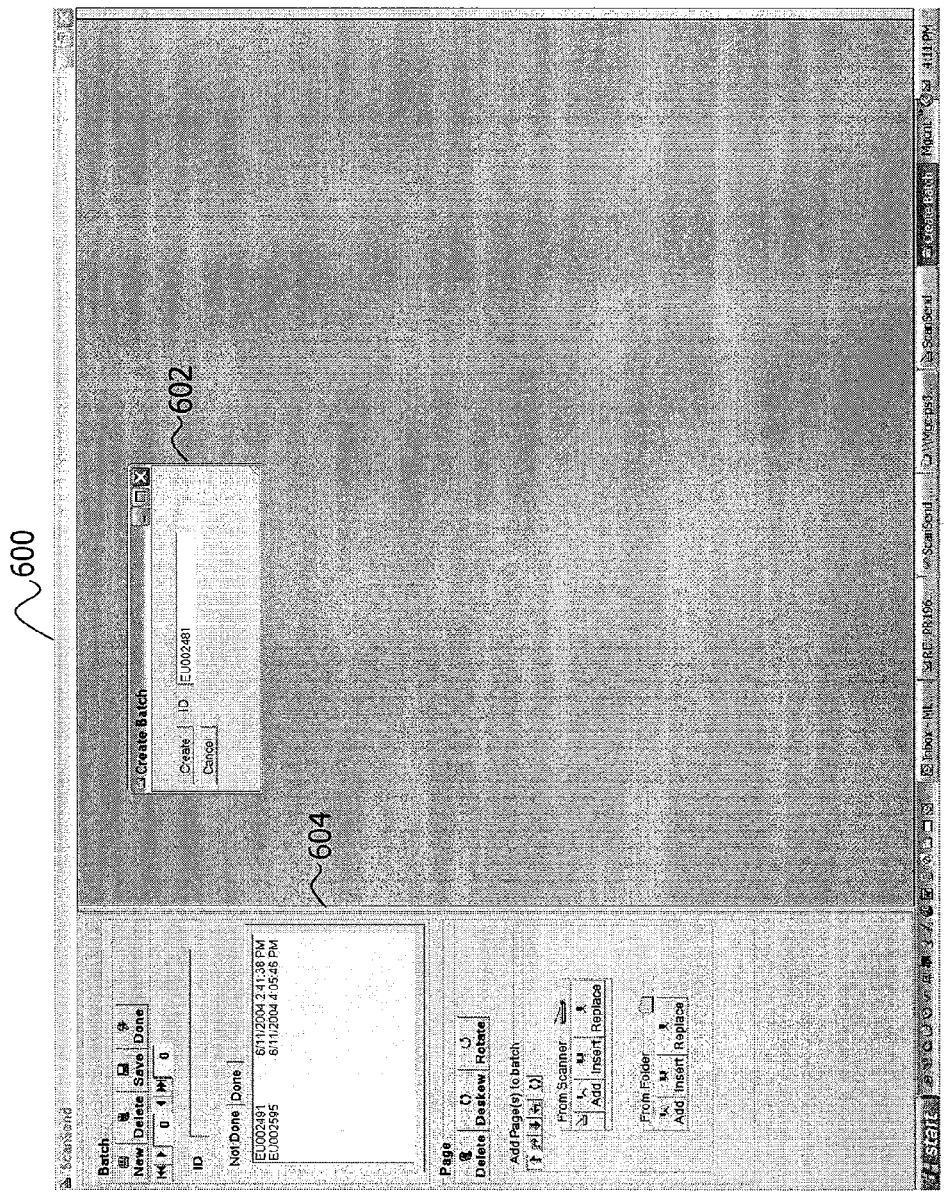
FIGS. 6-7 shows an embodiment of the ScanSend screen in use to create a batch of invoices.
Figure 7:
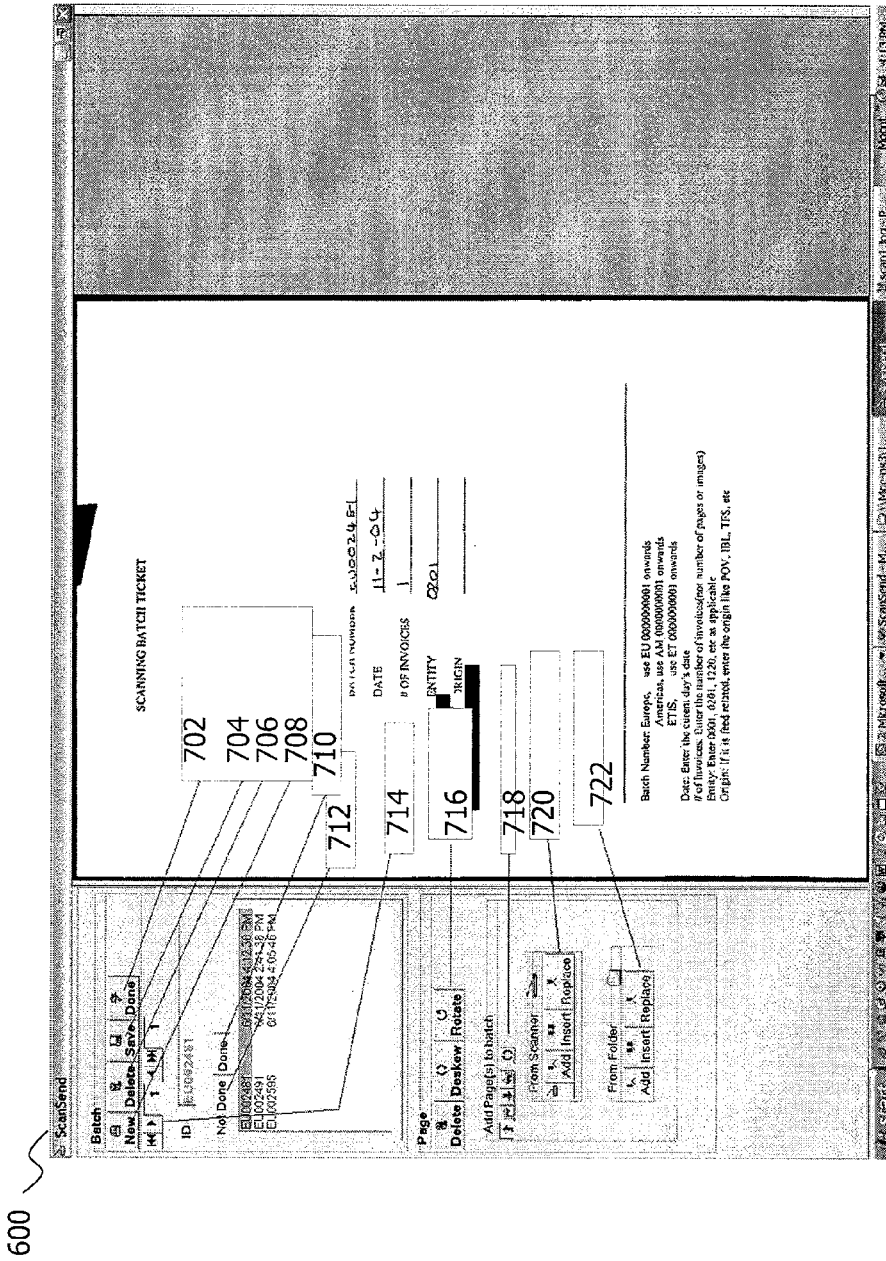

FIGS. 6-7 are exemplary screenshots of the ScanSend software according to embodiments of the invention. ScanSend is a software application installed at a client organization which allows for large numbers of invoices scanned to be easily delivered to the servicing organization. The ScanSend software is remotely downloaded from a servicing organization's computer onto a computer workstation connected to a scanner or to a high-end networked scanner/copier that permits software installation. The downloaded software is automatically installed after downloading. Once installed, ScanSend allows for the creation of batches of documents that can be scanned and automatically delivered to the servicing organization (e.g., server 224) via the Internet. ScanSend provides many advantages including: paper does not have to leave the client organization's facility, shipping costs are avoided, company documents are gathered in one central computer, and all images are encrypted and secure.

Client organizations using ScanSend may send images to the servicing organization's servers in a secure encrypted environment. All images are stored on IBM Raid 5 servers and are backed up in real time at a servicing organization's redundant facility. Client organizations immediately realize labor savings as well as historically approval audit history of every transaction. The historical images are stored in the tracking database 120 and are available to the client organization 24×7 via the Internet.

ScanSend allows client organizations to capture the paper documents globally and meet international paper retention requirements as well as avoid the shipping of paper.

FIG. 6 shows the ScanSend screen in use to create a batch of invoices. ScanSend application screen 600 contains a number of controls for creating and sending batches of scanned invoices to the servicing organization. Dialog box 602 enables a user to create a new batch and set its ID. Once the batch has been created it is displayed in grid control 604.

FIG. 7 shows the ScanSend screen in use to create a batch of invoices. ScanSend application screen 600 contains a number of controls for creating and sending batches of scanned invoices to the servicing organization. A "Done" menu button 702 initiates the delivery of a batch of invoices to the servicing organization's server. A "Save" menu button 704 saves the current configuration of a batch as the user is adding and organization the documents. A "Delete" menu button 706 removes the image and data related to the selected batch. A "New" menu button 708 shows the create batch dialog. When a user selects the "Done" tab 710 batches previously delivered are displayed. When a user selects the "Not Done" tab 712 batches not yet complete or delivered are displayed. Navigation buttons 714 allow a user to navigate through the list(s) of batches. Manipulation buttons 716 allow a user to "Delete," "Deskew" or "Rotate" the image currently displayed. "Deskew"-ing is the process of removing skew from the image. Batch order buttons 718 enable a user to control the location of the invoice within the batch. Scanner buttons 720 allow a user to add images to batch from a scanner. Folder buttons 722 allow a user to add images to batch from a folder.

Figure 8:
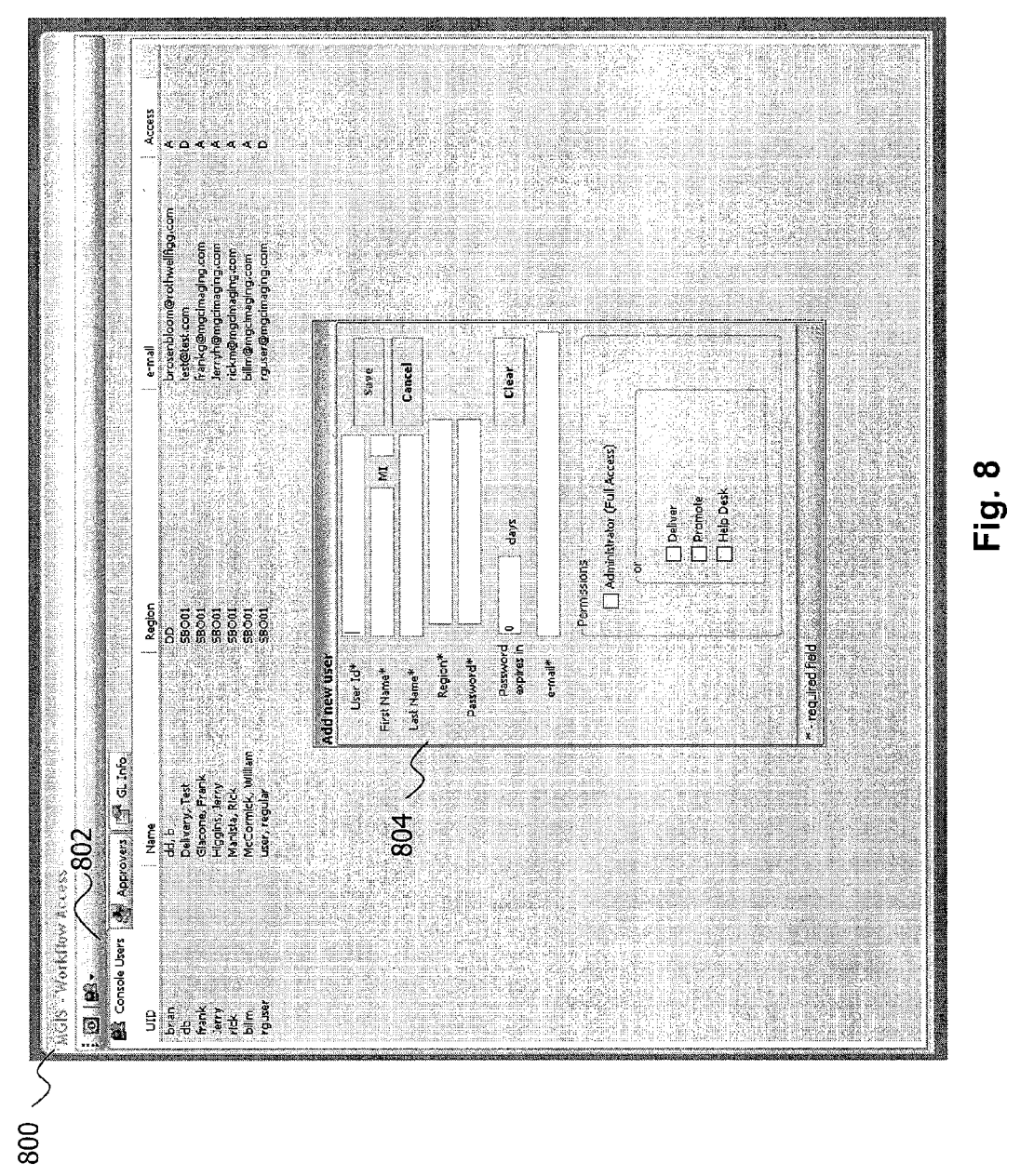
Figure 9:
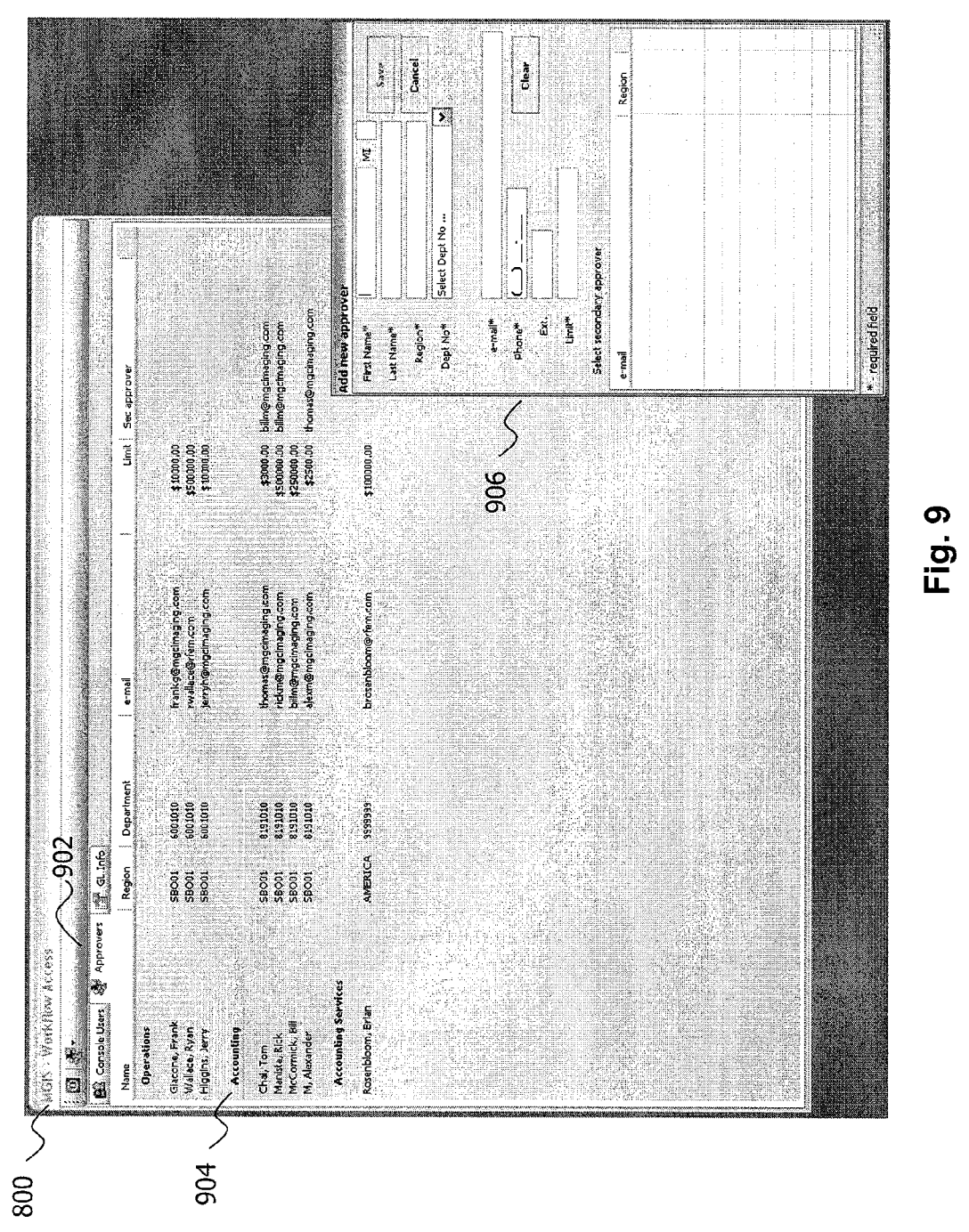
Figure 10:
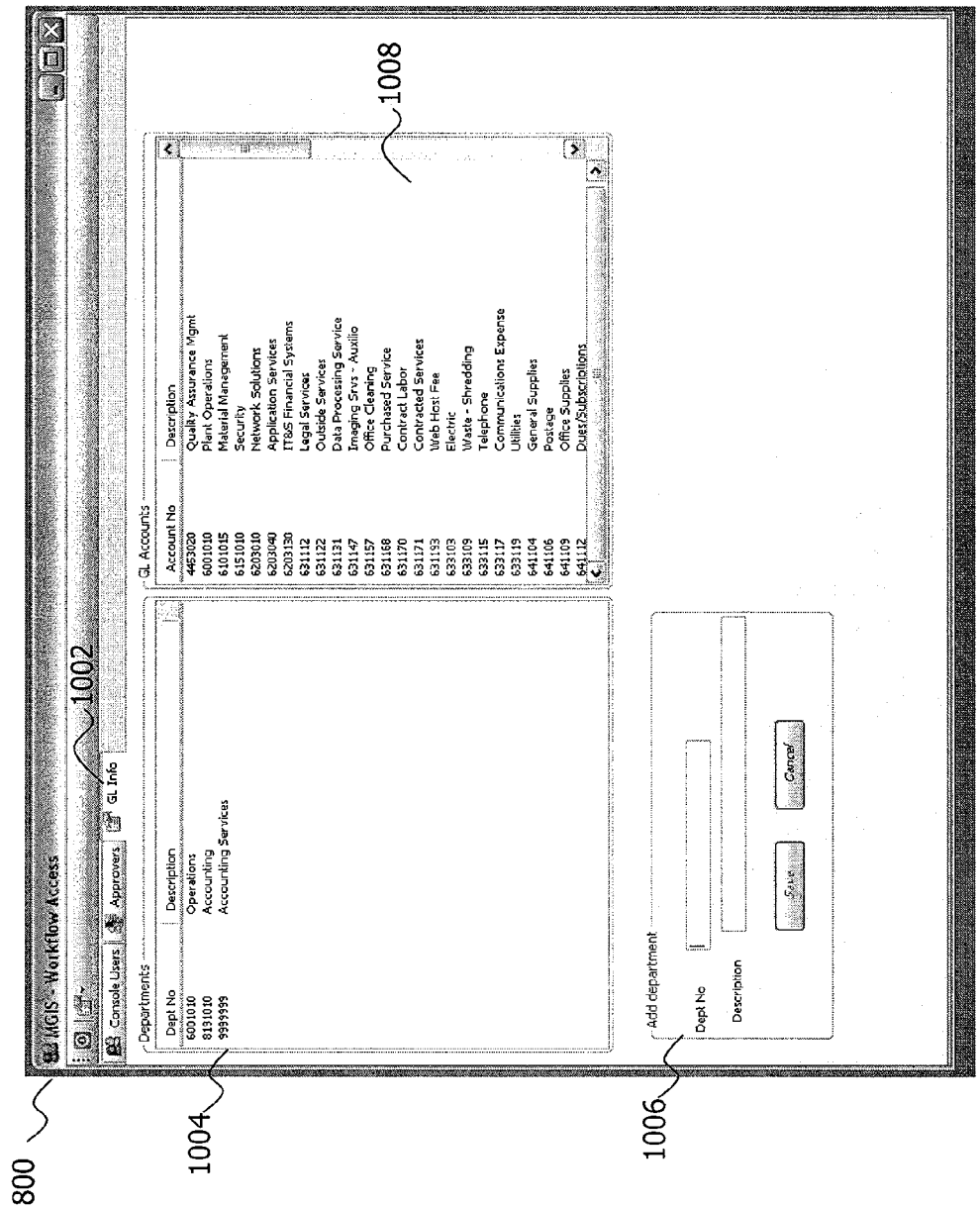

FIGS. 8-10 are exemplary screenshots of the system administration module according to embodiments of the invention.

The system administration module performs a number of tasks within the process including maintaining approver information (e.g., approver email addresses and approval limits), approval hierarchy, user access, and exception codes. Depending on the preference of the client organization, a system administrator can be a user for the client organization, the servicing organization, or outsource to a third party.

In addition to managing configuration data which indicates to the system how the process should flow, the system administrator supervises the document flow. Any exceptions that occur in the process can be viewed by a system administrator who can resolve the issue or route the issue to the appropriate personnel for resolution. The system administrator can also view and print the various reports provided by the application.

FIG. 8 shows a workflow administration screen 800 used to configure the workflow parameters. A "Console Users" tab 802 allows a user to create, view and edit the data stored for various users of the system. Right clicking on a name within the "Console Users" tab 802 brings up the edit user dialog 804 which is used for entering and editing user information.

FIG. 9 shows a workflow administration screen 800 used to configure the workflow parameters. An "Approvers" tab 902 allows a user to create, view and edit the data stored for approvers. Right clicking on a name within the "Approvers" tab 902 brings up the edit approver dialog 906 which is used for entering and editing approver information. The approver department panels 904 display the approvers by the assigned department.

FIG. 10 shows a workflow administration screen 800 used to configure the workflow parameters. A "GL Info" tab 1002 allows a user to create, view and edit the data stored for departments and GL accounts. A department grid control 1004 displays the departments currently configured in the application. Right clicking on a department within the department grid control 1004 causes the edit department panel 1006 to be displayed below the department grid control 1004. A GL accounts grid control 1008 displays the GL accounts currently configured in the application. Right clicking on a GL account within the GL accounts grid control 1008 causes the edit GL account panel to be displayed below the department grid control.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A computer implemented method of managing invoices comprising the steps of:
   receiving, by a first computer system, an electronic image of an invoice;
   assigning, by the first computer system, an invoice identifier (ID) to the invoice;
   storing, in a data storage unit that is part of the computer system or accessible to the computer system, the electronic image of the invoice such that the electronic image of the invoice is linked with the invoice ID so that the invoice ID can be used to retrieve the electronic image;
   storing information pertaining to the invoice such that the information is linked with the invoice ID;
   in response to a request transmitted from a user's computer, transmitting the electronic image to the user's computer, which is configured to display the electronic image;
   after transmitting the electronic image to the user's computer, receiving from the user's computer a message indicating whether or not the invoice requires approval;
   determining whether the invoice requires approval, wherein the determining step comprises parsing, by the computer system, the message;
   placing the invoice in a first queue of invoices in response to determining that the invoice does not require approval or placing the invoice in a second queue of invoices that is different than the first queue in response to determining that the invoice requires approval;
   receiving, from a user's computer, a request to process the invoices from the second queue of invoices; and
   in response to the request to process the invoices from the second queue of invoices, transmitting to the user's computer a first user interface screen that includes an electronic image of an invoice from the second queue, information pertaining to the invoice, and control elements for enabling the user to select an e-mail address of an approver and cause an e-mail to be sent to the approver's e-mail address, wherein
   the e-mail includes a link that when activated causes a second user interface screen to be transmitted to the approver's computer wherein the second user interface screen includes the electronic image of the invoice and control elements to allow the approver to indicate his approval of the invoice.

2. The method of claim 1, wherein the step of adding the invoice to the first queue consists of adding the invoice ID to a queue of invoice identifiers.

3. The method of claim 1, wherein the first user interface screen comprises:
   a validate control element for validating said information pertaining to the invoice that is displayed in the first user interface screen;
   a find approver button for causing a list of potential approvers to be displayed; and
   a send button for causing an e-mail to be sent to a selected e-mail address.

4. The method of claim 3, wherein the first user interface screen further comprises a skip button for causing the next invoice in the second queue to be displayed.

5. The method of claim 1, wherein the second user interface screen comprises:
   information pertaining to the invoice;
   exception control elements for enabling a user to select an exception condition;

a first control element configured to enable a user to specify general ledger information; and a second control element configured to enable a user to add a comment regarding the invoice.

6. The method of claim 1, further comprising:

receiving an indication that an approver has approved an invoice;

in response to receiving the indication, determining whether another approver needs to approve the invoice; and automatically transmitting an e-mail to the another approver if it is determined that the another approver needs to approve the invoice.

7. The method of claim 6, wherein the step of determining whether another approver needs to approve the invoice comprises determining whether the amount of the invoice exceeds a predetermined amount.

8. The method of claim 6, further comprising moving the invoice to an approved invoice queue.

9. The method of claim 8, further comprising enabling a user to view the invoices in the approved invoice queue and, for each invoice, indicate whether the approval process is complete.

10. The method of claim 1, wherein the first queue is on of a set of two or more shared services queues, each of which shared services queues contains invoices that do not require approval, wherein each of the two or more shared services queues is associated with a geographic region.

11. A computer implemented method of managing invoices comprising the steps of:

receiving, at a computer, an electronic invoice representing a balance due for fees or services;

placing a barcode on the first page of said invoice, said barcode being related to a unique document identification number;

inputting index data including at least the unique document identification number and invoice amount;

storing said invoice and said index data into a database;

notifying an approver that an invoice is ready to be viewed for approval;

displaying, on a computer, said invoice and said index data from said database along with controls allowing said approver to submit a response indicating whether said invoice is approved;

storing said response in said database;

posting said invoice and said index data into an accounting system; and retrieving payment information from said accounting system and storing said payment information in said database.

12. The method of claim 11, wherein said step of receiving comprises acquiring a paper invoice and scanning said paper invoice into a digital format.

13. The method of claim 11, further comprising the step of evaluating whether further approvals are required in response to the storing of said response in said database based on an approval hierarchy stored in said database.

14. The method of claim 13, further comprising iteratively executing the steps of:

notifying an approver that an invoice is ready to be viewed for approval;

displaying said invoice and said index data from said database along with controls allowing said approver to submit a response indicating whether said invoice is approved;

storing said response in said database, wherein said iterative execution continues until said step of evaluating said response determines that the invoice has been properly approved.

15. The method of claim 13, wherein the approval hierarchy is obtained from a human resources system.

16. An invoice processing system comprising:

an application server configured to execute an invoice processing application and connected to the internet via a communications network;

a database configured to store information relating to an invoice being processed by said invoice processing application and configuration information relating to said invoice processing application;

a first one or more client computer workstations connected to the internet via a communications network, configured to receive an electronic image of said invoice and to allow a user to input additional index data relating to said invoice and submit said electronic image and said index data to said invoice processing application; and a second one or more client computer workstations connected to the internet via a communications network and configured to enable an approver to receive and view said electronic image and said additional index data from said invoice processing application and indicate their approval or rejection of said invoice.

17. The system of claim 16, wherein said accounting system is configured to transmit the data resultant from the posting of said invoice and said index data to said application server which saves the data to said database.

18. The system of claim 16, further comprising an accounting system executing on a server connected to the internet via a communications network and remotely located from said application server, wherein upon approval of said invoice by said approver at said second one or more client computer workstations said invoice and said index data are posted to said accounting system which is configured to render payment to the vendor associated with said invoice.

19. A computer-implemented method of managing invoices, the method comprising:

(a) receiving, by a computer system, an image of an invoice;

(b) indexing, by the computer system, the invoice, wherein the indexing comprises: (b1) assigning a unique invoice identifier (ID) to the invoice and (b2) storing the image and ID in association with one another in a tracking database;

(c) determining, by the computer system, contact information for an approver for the invoice, wherein the determining comprises: (c1) sending the image to a first remote user and (c2) after the sending, receiving from the first remote user, contact information for a second remote user, wherein the second remote user is the approver;

(d) sending, by the computer system, the image to the approver using the contact information; and (e) receiving, by the computer system, an indication from the approver of whether the invoice is approved.

* * * * *